(12) United States Patent
Björklund

(10) Patent No.: US 9,557,105 B2
(45) Date of Patent: Jan. 31, 2017

(54) METHOD AND ARRANGEMENT FOR TORREFACTION WITH CONTROLLED ADDITION OF COOLING LIQUID TO THE TORREFIED MATERIAL

(75) Inventor: Peter Björklund, Umeå (FI)

(73) Assignee: VALMET AB, Sundsvall (SE)

( * ) Notice: Subject to any disclaimer, the term of this patent is extended or adjusted under 35 U.S.C. 154(b) by 440 days.

(21) Appl. No.: 14/360,663

(22) PCT Filed: Nov. 29, 2011

(86) PCT No.: PCT/SE2011/051446
§ 371 (c)(1),
(2), (4) Date: Jun. 18, 2014

(87) PCT Pub. No.: WO2013/081510
PCT Pub. Date: Jun. 6, 2013

(65) Prior Publication Data
US 2014/0338217 A1    Nov. 20, 2014

(51) Int. Cl.
*F26B 3/00* (2006.01)
*C10L 5/44* (2006.01)
*C10L 9/08* (2006.01)
*C10L 5/36* (2006.01)

(52) U.S. Cl.
CPC .................. *F26B 3/00* (2013.01); *C10L 5/442* (2013.01); *C10L 9/083* (2013.01); *C10L 5/363* (2013.01); *Y02E 50/10* (2013.01); *Y02E 50/15* (2013.01); *Y02E 50/30* (2013.01)

(58) Field of Classification Search
CPC ............. F26B 3/00; C10L 5/442; C10L 9/083; C10L 5/363; Y02E 50/30; Y02E 50/15; Y02E 50/10
See application file for complete search history.

(56) References Cited

U.S. PATENT DOCUMENTS

| 4,816,572 A | 3/1989 | Bourgeois |
| 2003/0221363 A1 | 12/2003 | Reed |
| 2011/0057060 A1 | 3/2011 | Sprouse |
| 2011/0179700 A1 | 7/2011 | Monroe |
| 2011/0252698 A1 | 10/2011 | Camper |

FOREIGN PATENT DOCUMENTS

| EP | 2385096 | 9/2011 |
| WO | WO2011112526 | 9/2011 |

*Primary Examiner* — Jiping Lu
(74) *Attorney, Agent, or Firm* — Fasth Law Offices; Rolf Fasth

(57) ABSTRACT

The improved method and arrangement are for cooling torrefied lignocellulosic material. By adding water in controlled amounts to the torrefied material in a grinder at exit from a roaster the entire volume of torrefied material could be cooled down to a temperature well below the critical temperature without increasing the water content of the final product.

19 Claims, 2 Drawing Sheets

METHOD AND ARRANGEMENT FOR TORREFACTION WITH CONTROLLED ADDITION OF COOLING LIQUID TO THE TORREFIED MATERIAL

PRIOR APPLICATION

This application is a U.S. national phase application that is based on and claims priority from International Application No. PCT/SE2011/051446, filed 29 Nov. 2011.

FIELD OF THE INVENTION

The present invention relates to a method and an arrangement at transforming lignocellulose material such as wood by means of thermo condensation into torrefied material which can be burnt to produce thermal energy.

BACKGROUND OF THE INVENTION

It is known that lignocellulose biomass material can be transformed through thermo condensation (torrefaction) to a product that is well suited for the production of thermal energy. A process for torrefaction is disclosed in, for example, U.S. Pat. No. 4,787,917. During torrefaction, lignocellulose material such as wood is subjected to a roasting process that takes place at elevated temperature. According to a presentation by J. P. Bourgeois and Jacqueline Douat entitled "Torrefied wood from temperate and tropical species, advantages and prospects" and held in Göteborg, Sweden at "Bioenergy 84" 15-21 Jun. 1984, torrefaction is performed in a temperature range of 180° C.-400° C. Torrefaction can also be understood as "thermo condensation", U.S. Pat. No. 4,816,572, which is here defined as isothermal treatment of lignocellulose materials to eliminate water and carbon oxides by chemical reactions.

The practical torrefaction process typically involves cutting or crushing a lignocellulose material into small pieces which are transported to a roaster where the material is exposed to elevated temperature in an inert atmosphere (oxygen free or low oxygen conditions). The temperature may be in the range of 180° C.-400° C. and typical values lie within a range of 250° C.-280° C. The roaster is a closed compartment which holds the inert gas phase, or a non-oxidizing inert gas may be passed through the roaster. The time used for torrefaction in the roaster depends largely on the temperature. U.S. Pat. No. 4,787,917 suggests that the process may be completed within 10 minutes and that 3-6 minutes may be considered suitable. Another document that discusses torrefaction, U.S. Patent Application Publication U.S. 2008/0022595, suggests that torrefaction is carried out at a temperature in the range of 250°-320° C. and with a residence time in the range of 10 to 40 minutes. During torrefaction, substances such as water vapor, hydrocarbons and carbon oxides leave the lignocellulose material and the residue is a solid product which has high energy content in relation to its mass. This improves the transport economy of the final product, i.e. it becomes cheaper to transport the torrefied product since its energy density is increased. The torrefied product is very friable and can thus easily be ground to particles that can be compacted to further increase the energy density.

Torrefied material has been subjected to elevated temperature during roasting, so it is very hot when it leaves the roaster and it is completely dry or the water content has been reduced to levels that are negligible. It is reactive and may very easily ignite in contact with airborne oxygen when it exits the reactor (the roaster). The torrefied material needs to be cooled to avoid the fire hazard. U.S. Pat. No. 4,787,917 suggests that torrefied material is cooled with a cold and non-oxidizing gas. The use of air would be inappropriate since it contains oxygen. U.S. Pat. No. 4,816,572 suggests that methods that are known per se may be used to control the atmosphere during the cooling process. The document mentions as an example the spraying of a small amount of water on the hot material to create a steam atmosphere and to increase the heat transfer rate at cooling, i.e. evaporative cooling. U.S. Pat. No. 4,816,572 further suggests that the material should not be contacted with an oxidizing medium until it has cooled below 200° C. Applying cooling water sprays on a bed of torrefied material is problematic since it may lead to an uneven cooling. Parts of the torrefied material bed may become sufficiently cooled while other parts remain at a temperature level which is dangerous when the material is later exposed to air. Adding more spray water will entail the disadvantage that some parts of the torrefied material receive too much water and becomes soaked. High moisture of the torrefied product must be avoided since it decreases the net heating value of the product. It is possible to even out the temperature differences in a bed of torrefied material by mixing it with a suitable device.

In this context, it is to be noted that torrefied material has a low thermal conductivity. The result is that the internal part of each individual particle in the bed of torrefied material is hotter than the surface of it. The bigger the particle, the hotter are the internal parts of the particles. The conclusion must be that cooling of a torrefied wood piece is a relatively slow process and that there is a risk that material pieces leave the cooling step with un-sufficiently cooled internal parts. There is a risk of exothermic reactions and fire when such a particle is penetrated by air.

It is desirable to compact the torrefied material to increase the density (e.g. combustible fuel pellets with high density) for reduction of the product volume at transportation and storage. The compaction machines typically need a feed temperature up to 100° C. in order to ensure a good pellet quality. The temperature of the torrefied material is typically around 250° C. when it exits the roaster. Such hot feed material will result in overheating of lubricants for bearings and rolls which results in wear and mechanical damage of the pelletizing machine. It is necessary to cool the torrefied product prior to pelletizing for protection of machinery. Reheating of torrefied material which is cooled to a very low temperature (much below 100° C.) prior to pelletizing will cause additional operation costs. The flow of cooling water should be controlled accurately from this point of view. Even when the quantity of water is very carefully selected, it may still be the case that parts of the torrefied material become soaked while other parts do not get sufficient cooling.

The biomass feed to torrefaction can be crushed or chipped forest residue. The particle size distribution of such feed is not directly suitable for a pelletizing process. Typical industrial pellets are made with dies having 6 or 8 mm holes through which the biomass is pressed to form pellets. The average particle size suitable for pelletizing should be below 3 mm (~⅛ inch), so it is necessary to grind the torrefied material in a mill prior to pelletizing it to fuel pellets.

The materials handling (conveying) from the roaster to a mill entails several problems since the hot torrefied material is dusty and highly reactive (i.e. flammable, possibly even explosive under certain circumstances). It is important to prevent leakage of air to the material in any transporting solution from the roasting to the mill, even when the torrefied material has undergone a cooling procedure because the cooling may have failed to cool all parts of the torrefied material to a safe level. In principle, the conveying system and the mill can be made inert by means of steam or nitrogen for example. However, in practice it is difficult to make the system perfectly sealed and any frictional heat by moving parts increases fire hazard.

One objective of the present invention is therefore to provide a method and an arrangement that achieves a uniform cooling through the entire volume of the torrefied material before it is exposed to an oxygen containing environment.

Another objective of the invention is to ensure safe grinding conditions of torrefied material to particles with a correct temperature and size for pelletizing purposes.

A third objective of the invention is to provide a method and arrangement which permits safe torrefied material handling (conveying) from grinding to pelletizing.

These and other objectives of the invention are achieved by the present invention as will be explained in the following.

DISCLOSURE OF THE INVENTION

The invention relates to a method at producing torrefied products which can be burned to produce thermal energy. In the method, lignocellulose biomass such as wood is used as a feed material for torrefaction. The method comprises the steps of: passing lignocellulose biomass material through a roaster where it is subjected to a temperature in the range 180° C.-400° C. in an atmosphere which is substantially free from oxygen such that the lignocellulose material becomes torrefied by means of thermo condensation; and passing the torrefied material from the roaster for grinding in a mill, for example a hammer mill or a disc refiner. According to the invention, a cooling liquid is added to the torrefied material during its transportation from the roaster to the mill or into the mill itself such that the cooling liquid is present during grinding of the torrefied material. At least a part of the cooling liquid is evaporated into steam such that the torrefied material undergoes evaporative cooling during the grinding process.

The mill, which also acts as a mixer may be designed as a hammer mill or a disc mill (disc refiner).

The cooling liquid is preferably water or a liquid that comprises water.

In embodiments of the invention, steam can be withdrawn from the mill and used to transport torrefied material from it to a separator where the steam is separated from torrefied material.

In embodiments of the invention, the pressure in the mill may differ from atmospheric pressure. The mill pressure may be over or under the ambient pressure according to cooling needs.

The amount of cooling liquid added may advantageously be controlled such that the temperature of the steam that is withdrawn from the mill is superheated at the pressure that prevails in it.

The separator may optionally comprise one or several cyclones. Preferably, it has at least two cyclones which cyclones may be connected in series or in parallel.

The torrefied material can be passed from the roaster to the mill by a screw feeder, plug screw feeder or a rotary lock feeder.

In embodiments of the invention, steam from the separator may be passed to a condenser for the generation of heat energy which is used for drying of lignocellulose material before the same is subjected to torrefaction.

Combustible gas which has been entrained by the steam from the separator to the condenser but which has not condensed may optionally be passed to a combustion unit.

Optionally, a gaseous medium such as steam can be added either to the mill or to an evacuation conduit connecting the mill to the separator. The purpose of such gaseous medium is to support transportation of the ground material to the separator.

The invention also relates to an arrangement for transforming lignocellulo sic material such as wood into a torrefied product that can be used to produce thermal energy. The inventive arrangement comprises is designed to carry out the inventive method and comprises the necessary corresponding components. The arrangement thus comprises a roaster in which the lignocellulosic material can be roasted; a mixing device following the roaster and a feeder to feed torrefied material from the roaster to the mixing device. Moreover, a first conduit is connected to either the mixing device or to the feeder that leads from the roaster to the mixing device such that a cooling liquid can be fed into feeder or directly into the mixing device.

Optionally, an evacuation conduit leads from the mixing device to a separator which preferably comprises at least one cyclone, even more preferred at least two cyclones which cyclones may be connected in series or in parallel.

Other details of the inventive method and the inventive arrangement will be explained in greater detail with reference to the appended figures.

SHORT DESCRIPTION OF THE FIGURES

DETAILED DESCRIPTION OF THE INVENTION

Figure 1:
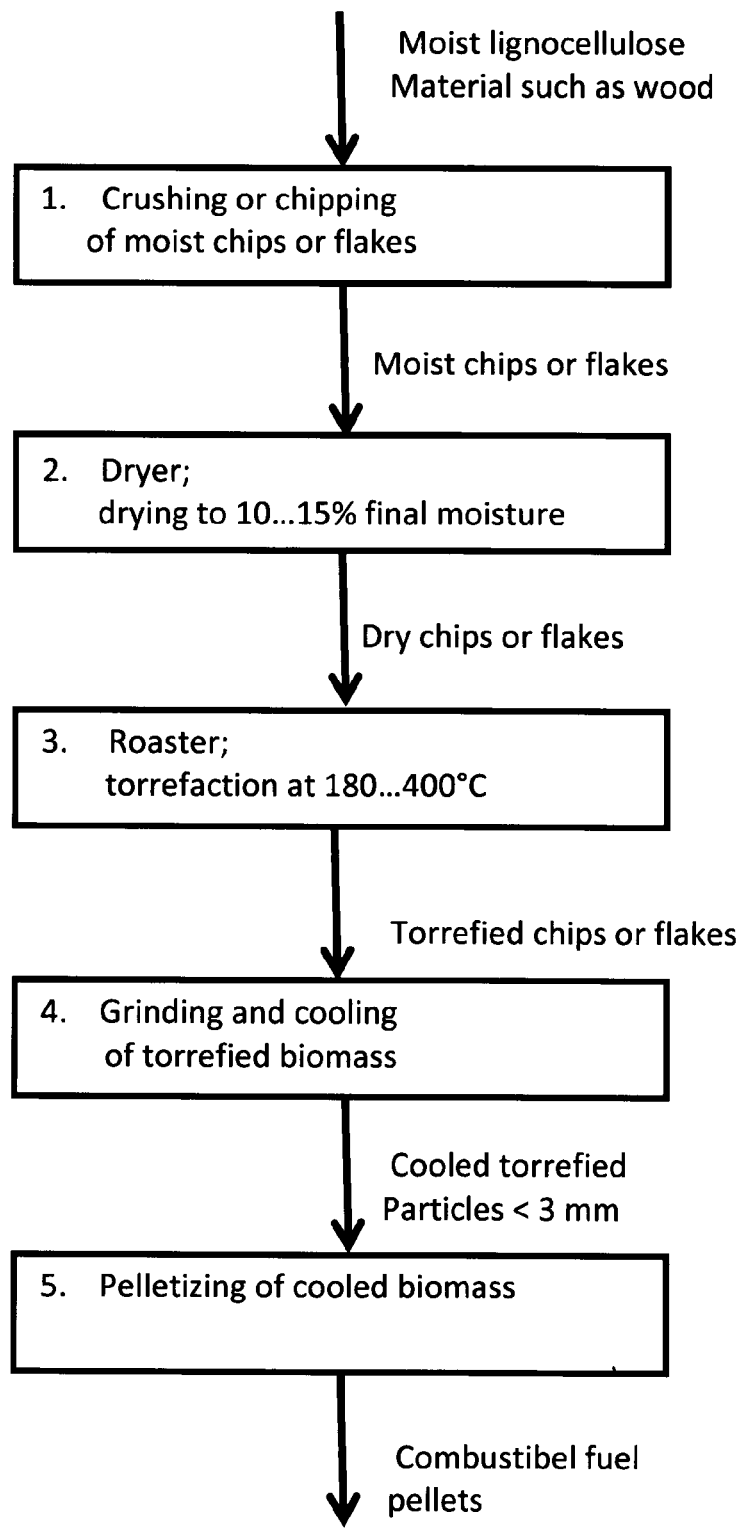
FIG. 1 is a block diagram representing a general lay-out of a torrefaction process. This block diagram may possibly be representative for the inventive method but may also apply to other torrefaction methods.
Figure 2:
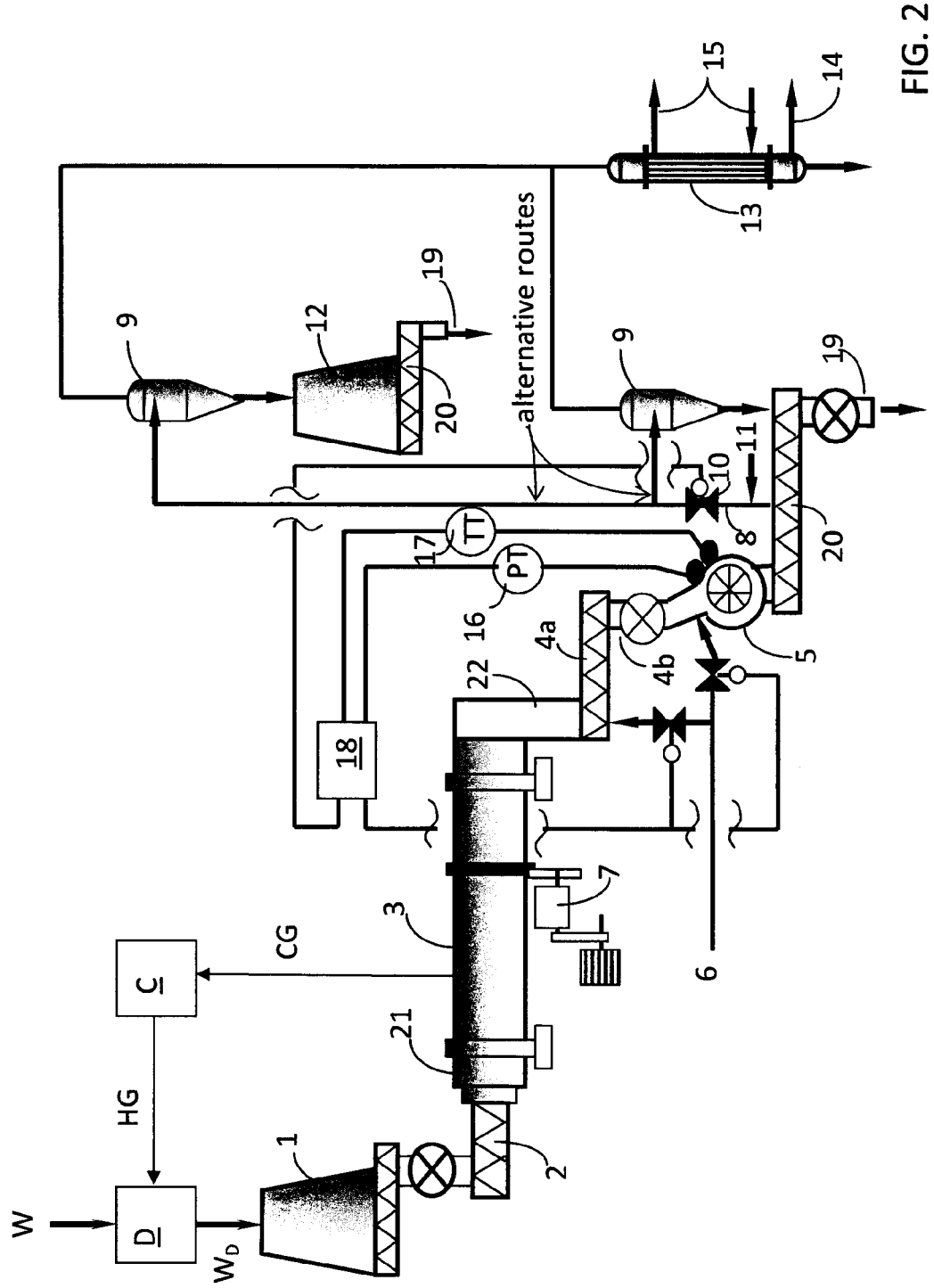
FIG. 2 is a schematic representation of the method and the arrangement according to the invention.

With reference to FIG. 1, an arrangement for transforming lignocellulose material to a torrefied product may (optionally) comprise a chipper or crusher 1 for decomposition of large pieces of for example wood into smaller pieces suitable for torrefaction. Lignocellulose material such as wood may be cut to pieces suitably having dimensions in the range of up to 40 mm. For example, if the lignocellulose material is in the shape of un-barked woody branches with a diameter of 5 mm-30 mm or 5 mm-20 mm; these may be cut to lengths of up to for example 40 mm or 50 mm. The above indicated dimensions should be understood as examples, other dimensions are conceivable. The material may be passed to the drying unit 2 after the lignocellulose material has been cut to pieces (chipping or crushing is not necessary if they already are small enough to be torrefied). As shown in FIG. 2 is the drying unit 2 a separate unit, but such design is optional and the drying step could be integrated as a first phase in a following roaster. The drying unit, or drying step, is a unit or step in which the lignocellulose material is moderately heated such that most of the water that is present in it evaporates. The temperature is lower than in the following roaster. In the drying unit, the moisture content of the lignocellulosic material is reduced typically to 10-15% such that the following roasting process can act on an almost dry material. From the drying unit 2, the lignocellulose material is fed to a roaster 3 for torrefaction.

The invention will now be explained with reference to FIG. 2. Lignocellulose biomass feed material W, is introduced into a drying unit D wherein moisture is driven off. Heating is done by passing hot gases HG through the drying unit. Subsequently dry lignocellulose biomass feed material $W_D$, is introduced into a bin or funnel 1 at the inlet end of the roaster. The lignocellulose biomass material W may be, for example, wood and it may have already been treated in a chipper or crusher and/or a drying unit when it arrives to the bin 1. A feeder 2 such as a screw feeder is arranged to feed the lignocellulose material W into the roaster 3. The roaster 3 is heated such that the interior temperature is in the range of 180° C.-400° C. Lignocellulose material W is thus passed through the roaster 3 and subjected to a temperature in the above indicated range such that the lignocellulose biomass material W becomes torrefied. In many practical embodiments, the temperature may be in the range of 200° C.-350° C. It may be advantageous in at least some cases to limit the temperature to no more than 280° C. since the decay reactions in the lignocellulose material may become exothermic at temperatures of (about) 280° C. or more. For this reason, a temperature in the range of for example 200° C.-280° C. may be chosen. The atmosphere in the roaster 3 is inert and non-oxidizing, i.e. free from oxygen or the oxygen content is very low, i.e. less than 2%.

During torrefaction in the roaster 3 are combustible gases driven off from the dry lignocellulose biomass feed material, including any residual moisture content. As shown in figure are most of these combustible gases sent to a combustion unit C producing hot gases HG that is used for the drying unit or stage. There is also a heating system for the roaster but this is not shown in drawings and such heating system could be a dedicated heating unit or any kind of heating unit using residual hot gases that may be available.

The roaster 3 may be shaped as a cylindrical drum, but the invention is not limited to a specific design of the roasting vessel. The roaster 3 in FIG. 2 is arranged to be rotated by means 7 that may act on the periphery of the roaster 3. Optionally, the longitudinal axis of the roaster may be inclined slightly towards the outlet end 22 (i.e. such that, in FIG. 2, the outlet 22 of the roaster 3 is at a lower level than the inlet 21 where lignocellulose biomass material is introduced). Thereby, it will be easier for the lignocellulose biomass material in the roaster 3 to move towards the outlet end 22. The required retention time of the lignocellulose biomass material W in the roaster depends to a large extent on the temperature but also on other factors, for example on particle size distribution, origin and the moisture content of the lignocellulose material W. For this reason, a suitable retention time must be determined on a case-by-case basis. However, a retention time of 3-10 minutes may be adequate in many practical applications.

As mentioned there are also other methods to technically arrange the roaster, for example, a screw conveyor, fluidized bed, oscillating bed, fixed bed. The material in the roaster can be heated directly with an inert gas or indirectly through a metal wall. These are only examples and other variations of roaster design are available.

The now torrefied material is passed from the roaster vessel 3, to a grinding device 5. The "grinding device 5" is from here and on also denoted "mill 5" for convenience.

In the embodiment according to FIG. 2, a feeder system 4a-4b is arranged to convey torrefied material from the roaster 3 to the mill 5. In the embodiment shown in FIG. 2, the feeder 4 comprises a first feeder part 4a which may be, for example, a screw conveyor; optionally a second feeder part or chute which forms a passage which is at least partially vertical and through which the torrefied material may drop down (due to gravity) to through a rotary lock feeder 4b to the mill 5. It should be understood that the feeder system 4a-4b could also be designed in other ways. For example, the feeder system 4a-4b may be formed by a single screw conveyor. In the figure the preferred feeder system 4a-4b provides for a gas phase lock between the inert gas phase of the roaster 3 and the mill 5 where cooling water is added, thus preventing water vapour from entering the roaster.

With reference to FIG. 2, it can be seen that an inlet conduit 6 is connected to both the first feeder part 4a and to the mill 5 immediately before (as shown) the mill or in the mill itself (not shown). This inlet conduit 6 is arranged to introduce a cooling liquid at least in one position either directly into the mill 5 and/or into a part of the first feeder part 4a that is arranged to convey torrefied material to the mill 5. Cooling liquid can thus be added to at least one of the first feeder part 4 and the mill 5. In FIG. 2, the inlet conduit 6 is shown as having one branch that leads to the first feeder part 4a and one branch that leads directly into the mill 5. It should be understood that this is only an example of one possible arrangement. Embodiments are of course possible where the inlet conduit 6 leads only into the mill 5 but not into the first feeder part 4a. Embodiments are also conceivable where the inlet conduit is connected to the first feeder part but not to the mill 5. The inlet conduit 6 could be connected to any of the different parts (4a, 4b) if the feeder system comprises several different parts. The inlet conduit could also be connected to the feeder system in more than one place. For example, it could be connected to the feeder on multiple successive locations following each other in the direction of movement of the torrefied material. In the same way, the inlet conduit 6 could be connected to the mill 5 at more than one point. There could also be one or several separate inlet conduits 6 that lead to the feeder 4 while there are one or several inlet conduits 6 for cooling liquid that lead to the mill 5. The term "inlet conduit 6" should thus be understood as referring to one or several inlet conduits 6 that lead to the feeder system and/or the mill 5 such that cooling liquid can be mixed with the torrefied material in the mill 5.

The cooling liquid is suitably water. For convenience, the cooling liquid will be referred to in the following as "water" even though other liquids might be considered.

As said, water is added to the torrefied material immediately before or in the mill 5. The water is mixed thoroughly to the torrefied material in the mill 5; The shaft power used for grinding will ensure an efficient and rapid mixing process. The torrefied material feed to the mill is very hot and most of the water will evaporate during the grinding process in the mill 5 thereby cooling the torrefied material. Preferably, at least 90% of all water that is added is evaporated in the mill 5. Even more preferred all water or substantially all water that is added is evaporated.

The use of a mill 5 as an evaporative cooler offers many benefits simultaneously, a safe grinding process in inert atmosphere, efficient and rapid cooling and a uniformly cooled product stream suitable for pelletizing.

The mill 5 may be any kind of grinding device which is capable of achieving simultaneous mixing of the torrefied material and the cooling liquid.

The grinding device could be for example a hammer mill. A hammer mill consists of a rotor assembly enclosed in a grinding chamber. The working mechanisms are the hammers, which may be fixed or swinging mounted on the rotor and a screen that encircle the rotor. Size reduction in a hammer mill is a result of impact between the rapidly moving hammers and the incoming material.

The mill 5 could also be a disc mill with disc(s) rotating in a housing with walls corresponding to the grinding disc element(s). A gap between the disc(s) and/or the inner wall of the housing may form a passage through which the torrefied material must pass.

The mill 5 could also be formed by two or more rolls that contact each other in nips through which the torrefied material must pass together with the cooling liquid.

The mill 5 achieves a very effective mixing of water and torrefied material. Torrefied material is effectively broken up into small particles and water is simultaneously mixed to the particles. The torrefied material surface is exposed effectively to the cooling water such that a very uniform direct evaporative cooling is achieved. The torrefied material is preferably ground to an average particle size less than 3 mm (⅛ inch.). Also the friction heat from the grinding process evaporates cooling liquid and contributes to the steam production in the mill. By a particle size of less than 3 mm no risk could remain that one still has critical temperatures inside larger chunks of torrefied material. It is easy to control the temperature in the mill at a desired level, because water is effectively mixed during grinding with the torrefied material inside the mill 5. The torrefied particles temperature will be close to the steam temperature due to the efficient mixing process in the mill 5. The mill 5 may optionally comprise or be connected to a temperature sensor 17 and a pressure sensor 16 which monitor temperature and pressure in it. The sensors 16 and 17 may be connected to a control device 18 (for example a computer) which in turn may be arranged to control the amount of water that is introduced through the inlet conduit 6. The cooling water flow is adjusted to achieve slightly superheated conditions at the prevailing pressure. Suitably, the amount of water added is such that all water added through the inlet conduit 6 (or inlet conduits 6) evaporates. However, embodiments are conceivable where all water is not evaporated but it is preferable that at least 90% of the water added is evaporated. It should be understood that part of the evaporation may occur before the water has reached the mill 5, but the major part of the evaporation occurs during the grinding process. The control device 18 controls grinding conditions such that the torrefied material reaches a predetermined temperature. Suitably, the pressure of the mill is adjusted such that a temperature around 100° C. can be achieved by adding cooling water since this temperature level is acceptable for pelletizing machinery.

With reference to FIG. 2, the part of the cooling water that has evaporated into steam in (or before) the mill 5 can be withdrawn through an evacuation conduit 8. Part or all of the torrefied product which is ground into small particles will be transported from the mill 5 by the steam. The steam which carries torrefied product will follow the evacuation conduit 8 to a separator 9 where the torrefied material and steam are separated from each other.

The evacuation conduit 8 may be provided with a valve 10 which can be used to control the pressure in the mill 5 and thus indirectly the flow of steam and torrefied material through the evacuation conduit 8. The valve 10 may be controlled by the control unit 18 or by a manual control.

In embodiments of the invention, the separator 9 comprises at least one cyclone. Preferably, the separator 9 comprises at least two cyclones which cyclones may be connected in series or in parallel. Of course, the separator 9 may also comprise more than two cyclones and the cyclones may be connected partially in series and partially in parallel. For example, two cyclones connected in series may be followed by two cyclones connected in parallel.

Torrefied material is separated as a dense fraction with the separator 9. In embodiments of the invention, separated torrefied material may be allowed to drop into a receiver 12. In the receiver 12, preferably at the bottom of the receiver 12, a feeder 20 such as a screw feeder may optionally be arranged. The receiver 12 is inert with respect to fire since the gas-phase comprises mostly water vapor. The feeder 20 may be arranged to feed torrefied material to an exit opening 19 from which the torrefied material may be conveyed for example to a pelletizing machine (not shown) where it is compacted to fuel pellets. When the torrefied material leaves the exit opening, it should preferably have a temperature in the range of 70° C.-135° C., more preferred 80° C.-135° C. and even more preferred 95° C.-120° C.

The separator 9 is suitably placed close to the pelletizing machine. Therefore, the exit opening 19 of the receiver 12 may be connected to such a unit for compaction of the torrefied material (not shown in the figures).

Steam from the separator 9 may be passed to a condenser 13 where the latent heat of the steam is recovered. The heat of condensation can be used, for example, for drying of the lignocellulose biomass material before it is subjected to torrefaction. The heat can thus be used in the drying unit 2 of FIG. 1. In this way, the total process may become very energy efficient. Heat energy from the condenser 13 may be transported through a conduit 15.

The steam that leaves the mill 5 contains some residual amounts of combustible gases. Combustible gas that has been entrained by the steam to the condenser 13 but which is not condensed may be passed to a combustion unit. The heat of combustion is recovered and used for example to heat the roaster 3 or to contribute to heating the roaster 3. Such combustible gas may be passed from the condenser 13 through a conduit 14 to a heating unit (not shown). However, the volume of combustible gases in conduit 14 is only a small fraction of the volumes of combustible gases that are driven off from the roaster 3 (shown in flow CG). Typically the volume in conduit 14 is only 10% or even less than the volume of combustible gases leaving the roaster.

The flow of steam due to evaporative cooling in the mill 5 depends mainly on the temperature of the torrefied material; the mass flow of torrefied material to the mill; the amount of water added, the mill pressure and the shaft power of the mill. In case the steam generated by the evaporative cooling process is insufficient to carry the torrefied material to the separator 9, a gaseous medium (for example steam) may be added either to the mill 5 or to the evacuation conduit 8 at a location downstream of the mill 5. In FIG. 2, it is schematically indicated how a source of gaseous medium is connected via a conduit 11 to the evacuation conduit 8. It should be understood that it could also (or alternatively) connect directly to the mill 5. In this way, an extra amount of gaseous medium (e.g. steam) can be added to the flow of steam coming from evaporated cooling water and help carry the torrefied material to the separator 9.

Thanks to the invention, the cooling can be made efficiently and uniformly. Substantially all parts of the torrefied material volume become uniformly cooled and yet soaking of the torrefied material can be avoided since the process can be controlled such that substantially all water is evaporated. The risk that too much water is added is substantially reduced or even eliminated. The invention described above may be understood both in terms of a method of producing torrefied material and in terms of an arrangement for carrying out the inventive method. It should be understood, however, that these categories only reflect different aspects of one and the same invention. Therefore, such method steps that would be the inevitable result of using such parts of the inventive arrangement that have been described above may be part of the method, regardless of whether such steps have been explicitly mentioned or not.

In the same way, the inventive arrangement may comprise means for carrying out method steps indicated, regardless of whether such means have been explicitly mentioned or not.

While the present invention has been described in accordance with preferred compositions and embodiments, it is to be understood that certain substitutions and alterations may be made thereto without departing from the spirit and scope of the following claims.

I claim:

1. A method at producing torrefied products which are burnable to produce thermal energy, in which method a lignocellulose biomass material (W) is used as a starting material for the torrefied products and which method comprises the steps of:
    passing lignocellulose material (W) through a roaster in which the lignocellulose material is subjected to a temperature in the range of 180° C.-400° C. in an inert atmosphere which is substantially free from oxygen such that the lignocellulose material becomes torrefied;
    passing the torrefied material from the roaster to a mill,
    a cooling liquid is added to the torrefied material at least in one position between the roaster and the exit of the mill such that the cooling liquid is mixed in the torrefied lignocellulose material during the grinding, and
    passing the torrefied lignocellulose material and mixed cooling liquid to a separator where steam is separated thereby cooling the torrefied material simultaneously, and subsequently passing the cooled torrefied lignocellulose material to a pelletizing machine.

2. A method according to claim 1, wherein the torrefied material is maintained in an inert atmosphere from the roaster and to the exit of the mill.

3. A method according to claim 2, wherein the mill is a grinding machine with an extended grinding gap through which the torrefied material and cooling liquid must pass a disc refiner.

4. A method according to claim 3, wherein the torrefied material is ground to an average particle size of less than 3 mm.

5. A method according to claim 2, wherein the mill is a hammer mill.

6. A method according to claim 2, wherein the torrefied material is passed from the roaster to the mill by a feeder.

7. A method according to claim 2, wherein at least 90% of the cooling liquid is evaporated.

8. A method according to claim 1 wherein the cooling liquid is water.

9. A method according to claim 1 wherein steam released during evaporative cooling is used to transport torrefied material through the mill.

10. A method according to claim 1 wherein steam is withdrawn from the mill and used to transport torrefied material away from the mill to a separator where steam is separated from torrefied material.

11. A method according to claim 10, wherein the separator comprises at least one cyclone.

12. A method according to claim 10, wherein steam from the separator is passed to a condenser for recovery of heat which is used for drying of lignocellulose material before the lignocellulose material is subjected to torrefaction.

13. A method according to claim 12, wherein combustible gas which has been entrained by the steam to the condenser but which has not condensed is passed to a combustion unit.

14. A method according to claim 10, wherein a gaseous medium is added either to mill or to an evacuation conduit connecting the mill to the separator.

15. A method according to claim 1 wherein the pressure in the grinding device is between 0.5 bar (a) and 3.0 bar (a).

16. A method according to claim 1 wherein the amount of cooling liquid added is controlled such that the temperature of the steam that is withdrawn from the grinding device is superheated at the pressure that prevails in the grinding device.

17. An arrangement for transforming lignocellulose material to a torrefied product that is usable to produce thermal energy, the arrangement comprising:
    a roaster vessel in which the lignocellulose material is torrefied;
    a mill connected to and following the roaster and a feeder to feed torrefied material from the roaster to the mill, said roaster vessel and said mill containing an inert treatment gas phase,
    an inlet conduit for liquid is connected to at least one position between the roaster exit and the exit of the mill such that a cooling liquid is feedable into feeder and/or directly into the mill to be mixed with the torrefied material, and
    a separator is located after the mixing of cooling liquid such that steam is separated from the torrefied material before the cooled torrefied material is sent to a pelletizing machine.

18. An arrangement according to claim 17, wherein an evacuation conduit leads from the outlet of the mill to a separator that comprises at least one cyclone.

19. An arrangement according to claim 17, wherein the mill comprises a grinding machine having an extended grinding gap through which the torrefied material and cooling liquid must pass.

* * * * *